United States Patent [19]
Fahy et al.

[11] Patent Number: 5,129,276
[45] Date of Patent: Jul. 14, 1992

[54] MESHING GEAR MEMBERS

[75] Inventors: Arthur J. Fahy, Double Bay; Neil Gillies, Earlwood, both of Australia

[73] Assignee: IVG Australia Pty. Limited, Bankstown, Australia

[21] Appl. No.: 590,293

[22] Filed: Sep. 28, 1990

[30] Foreign Application Priority Data

Sep. 28, 1989 [AU] Australia .................. PJ6633

[51] Int. Cl.⁵ .......................... F16H 1/18; F16H 1/20
[52] U.S. Cl. ................... 74/424.5; 74/424.7; 192/8 R
[58] Field of Search ............ 74/424.5, 424.5, 424.7; 418/201.3, 201.1, 201.2, 201.3; 192/8 R

[56] References Cited

U.S. PATENT DOCUMENTS

| | | | |
|---|---|---|---|
| 2,973,660 | 3/1961 | Popper | 74/424.5 |
| 3,170,566 | 2/1965 | Zimmermann | 418/201.1 X |
| 3,481,215 | 12/1969 | Howell | 74/424.5 |
| 3,688,597 | 9/1972 | Watson | 74/424.5 |
| 3,807,911 | 4/1974 | Caffrey | 418/201.1 X |
| 4,371,324 | 1/1983 | Gustafsson | 418/201.3 |
| 4,858,487 | 8/1989 | Mercier | 74/424.7 |
| 4,952,125 | 8/1990 | Nagai | 418/201.3 |

FOREIGN PATENT DOCUMENTS

| | | | |
|---|---|---|---|
| 2-176241 | 7/1990 | Japan | 74/424.7 |
| 2-217650 | 8/1990 | Japan | |

OTHER PUBLICATIONS

Marks' Standard Handbook for Mechanical Engineers, McGraw-Hill Book Company, 1987, pp. 8-98. Attachment "A".
Deutschman, Aaron D., "Machine Design; theory and practice", 1975, pp. 602 and 603. Attachment B.

*Primary Examiner*—Allan D. Herrmann
*Assistant Examiner*—David W. Laub
*Attorney, Agent, or Firm*—Dellett, Smith-Hill and Bedell

[57] ABSTRACT

A drive mechanism has two parallel shafts (2,3) provided with overlapping circumferentially-extending spiral teeth (4,5) of the same hand. The shape and positioning of the teeth is such that when one of the shafts is rotated, the steep flank surfaces (7,9) of its teeth engage the steep flank surfaces (9,7) of the teeth of the other shaft and force it to rotate in the same direction. Unidirectional drive may be obtained by providing each tooth with a gently sloping flank surface (8,10) on one side. The engagement of the gently sloping flank surfaces prevents rotation of the shafts if the driving torque is reversed.

8 Claims, 3 Drawing Sheets

MESHING GEAR MEMBERS

FIELD OF INVENTION

This invention relates to a mechanism having meshing gear members.

STATE OF THE ART

Conventional gear members such as gear wheels, have a meshing zone between them. The passage of the teeth of one gear member through the meshing zone produces rotation of the other gear member in the reverse direction. If it is required to restore the original direction of rotation, an idler gear wheel has to be interposed between the the two gear members.

AN OBJECT OF THE INVENTION

An object of this invention is to provide a mechanism having two meshing toothed members which rotate in the same direction during transmission of drive from one of the members to the other member.

SUMMARY OF THE INVENTION

In accordance with the present invention, a mechanism includes two rotary members having straight, parallel axes of rotation and formed with helical teeth of the same pitch and of the same hand, extending lengthwise of the axes of the members, the teeth having contacting flank surfaces which overlap one another in a meshing zone extending lengthwise between the two members, and the profile of the contacting two surfaces and the pitch of the teeth being so chosen that the rotation of one of the members produces sliding movement of its flank surface over the contacting flank surface of the other member so as to impart to it a rotational torque which turns it in the same direction if both members are externally toothed, and in the opposite direction if one of the members is internally toothed and the other member externally toothed.

PREFERRED FEATURES OF THE INVENTION

The flank surfaces of the teeth of the members may be symmetrical, so that the reversal of the direction of rotation of one member will produce reversal in the direction of rotation of the other member. On the other hand, the profiles of the flank surfaces of each tooth may be asymmetrical, and arranged so that rotational drive can only be transmitted in one direction between the two members. Any attempt for the load to reverse the direction of drive rotation results in the teeth binding or locking on one another to prevent rotation.

The members may be made of metal or non-metal, such as a self-lubricating plastic or ceramic materia. Wear may be reduced by reducing the contact presusre between the teeth. This may be achieved by increasing the number of convolutions of the teeth which are contiguous, and also by shaping the flank surface of the teeth so that they make linear contact with one another in the meshing zone, rather than point contact.

INTRODUCTION TO THE DRAWINGS

The invention will now be described in more detial, by way of example, with reference to the accompanying diagrammatic and schematic drawings, in which.
In THE DRAWINGS
FIG. 1 is a plan view of a gear mechanism having two axially parallel externally toothed gear members;

DESCRIPTION OF THE GENERAL EMBODIMENT OF INVENTION

Figure 1:
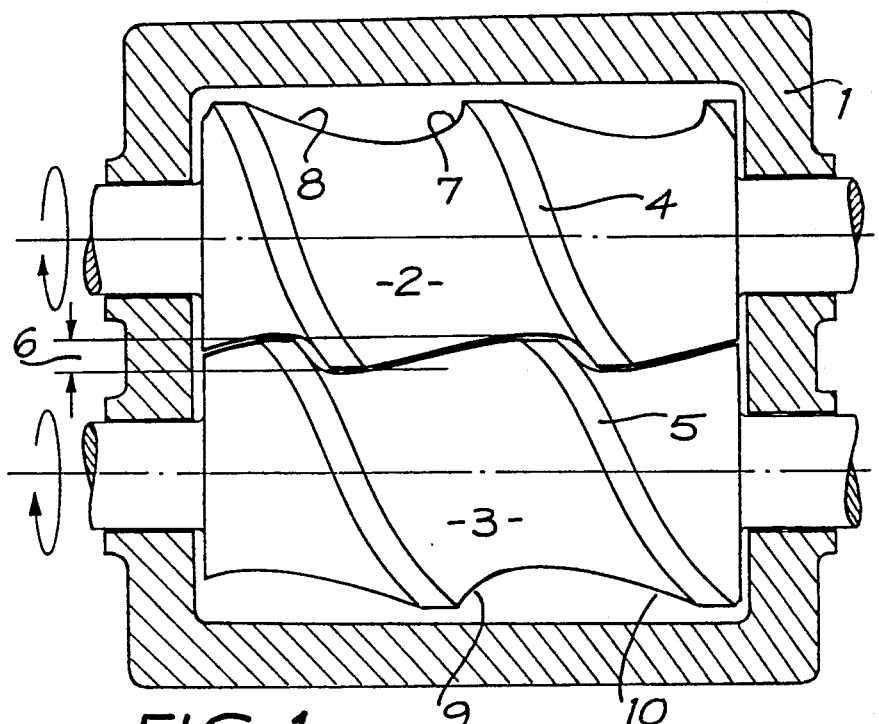
Figure 2:
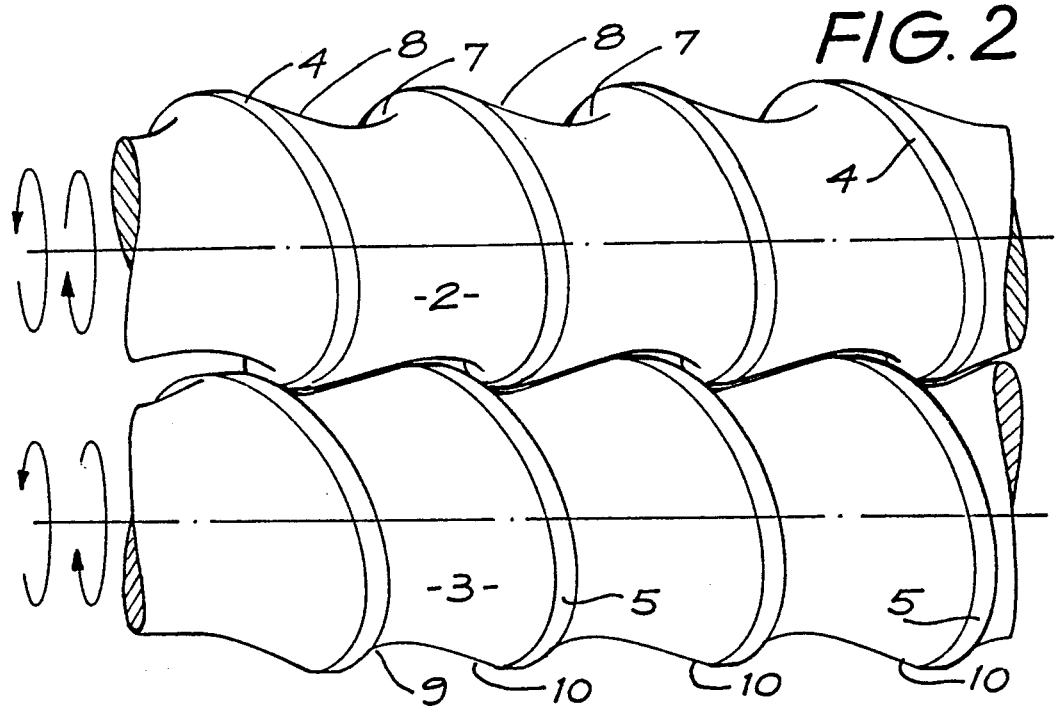
FIG. 2 is a perspective view of two gear members similar to those shown in FIG. 1 but having extended lengths to increase the drive transmittable between them.

FIG. 1 shows a rectangular casing 1 spanned by two, axially parallel, locking/dring gear members 2 and 3 of the type shown in FIG. 2. The gear members 2 and 3 are mounted in the the casing 1 by means of bearings (not shown) that allow rotational movement of the members 2 and 3 relative to the casing 1. Each member has a longitudinally-extending external helical tooth. The teeth of the members 2 and 3 are respectively referenced 4 and 5, and are both right-handed and overlap one another in a meshing zone 6, extending lengthwise parallel to and between the members 2 and 3.

The pitches of the teeth 4 are 5 are the same and each tooth has an asymmetrical profile, providing the tooth 4 with a steep flank surface 7 and a gently sloping flank surface 8 and tooth 5 with a steep flank surface 9 and a gently sloping flank surface 10. The steep flank surface 7 of the tooth 4 confronts the steep flank surface 9 of the tooth 5 in the meshing zone and similarly the gently sloping flank surfce 8 of the tooth 4 confronts the genetly sloping flank surface 10 of the tooth 5 in the meshing zone. The surface contour of the flank surfaces 7 and 9, and the pitch of the teeth 4 and 5, are so chosen that the flank surface 7 bears on the flank surface 9 with a linear region of contact, rather than a point contact, as is explained later with reference to FIG. 3.

OPERATION OF EMBODIMENT

In operation of the mechanism, it will be assumed that torque is applied to the gear member 2 is in the counter clockwise sense. When the gear member 2 rotates int he counter clockwise sense, the convolutions of its tooth 4 propagate in one direction along the meshing zone 6, i.e. from right to left in the drawing, with the step flank surface 7 leading and the gently sloping flank surface 8 trailing. This brings the steep leading flank surfce 7 of the tooth 4 into engagement with the steep flank surface 9 of the tooth 5. The steep flank surface 7 slides across the sleep flank surface 9, while simultaneously applying a grace to the tooth 5 in the direction of propogation of the convolutions. This gace results in a rotational torque being exerted on the member 3 so that it rotates in the same direction as the member 2.

When the gear member 2 is driving the gear member 3 as already described, a small space exists between their gently sloping flank surfaces 8 and 10, so that they do not impede the transmission of drive. However, if torque is applied to the member 2 in the clockwise sense, so that the convolutions of its tooth 4 tend to propagate from left to right, the gently sloping flank surface 8 of the tooth 4 is brought to bear on the gently sloping flank surface 10 of the tooth 3. The gently sloping flank surface bind and the member 3 therefore blocks rotation of the member 2. Such a mechanism therefore displays unidirectional drive transmissions properties. if bi-directional drive transmission properties are required, the two flank surfaces of the members 2 and 3 can both be provided with steep gradients as with the flank surfaces 7 and 9, so that they slide over one another in both directions of rotation of the member 2.

The members 2 and 3 may be made out of metal, self-lubricating plastics or a hard ceramic mateiral, which is also preferably self-lubricating. The pressure exerted on the tooth flank surfaces in contact with one another can be reduced by increasing the number of convolutions of the teeth 2 and 3 in contact with one another, and by extending the length of the region where they bear on one another, as will now be explained with reference to FIG. 3.

The following mathematical principles should be observed in order to provide a line of contact between the flank surfaces of the teeth convolutions.

Figure 3:
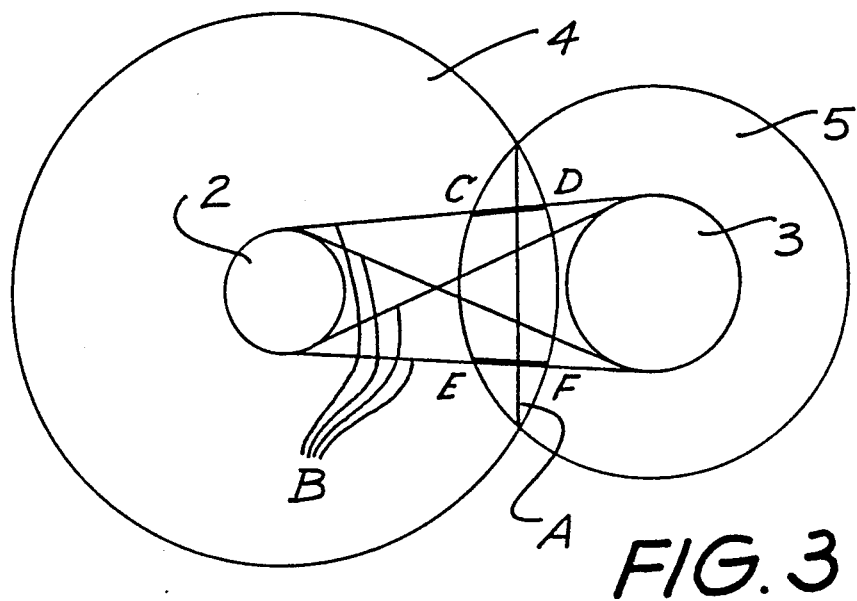
FIG. 3 is a diagram used to explain how a linear region of gear tooth contact is obtained; and, FIG. 4 is a prespective diagrammatic view of a hand winch employing the invention; and, FIG. 5 is a perspective view, in exploded form and partially broken away, of a differential gear mechanism having two meshing members one of which is an internal gear and the other of which is an external gear.

To obtain line contact between two external helical, toothed members 2 and 3, reference should be made of FIG. 3. Assuming the teeth have the same hand, or helix direction and the same or a different lead, they will provide a theoretical line contact when of single or multi-start form with identical pitch, provided that their flanks are composed of involute helicoids with generating base diameters proportional to their respective lead, and the rotational axies of the members 2 and 3, are parallel and spaced so that a line "A" joining the intersections of their outside diameters passes acrss the outer of the four lines "B" which are tangent to both generating base diameters. The lines CD and EF show the linear regions of tooth contact.

Although the invention has been specifically described with reference to external gears, it will be understood by one skilled in the art that that the invention is equally applicable tothe combination of an external gear running on an internal gear. However, with this configuration of gears, the running direction of both gear teeth is the same so that, when using the invention, the effect is to rotate the gears in opposite directions respectively. Such an arrangement is described later with reference to FIG. 5.

DESCRIPTION OF WHICH EMBOIDMENT OF INVENTION

Figure 4:
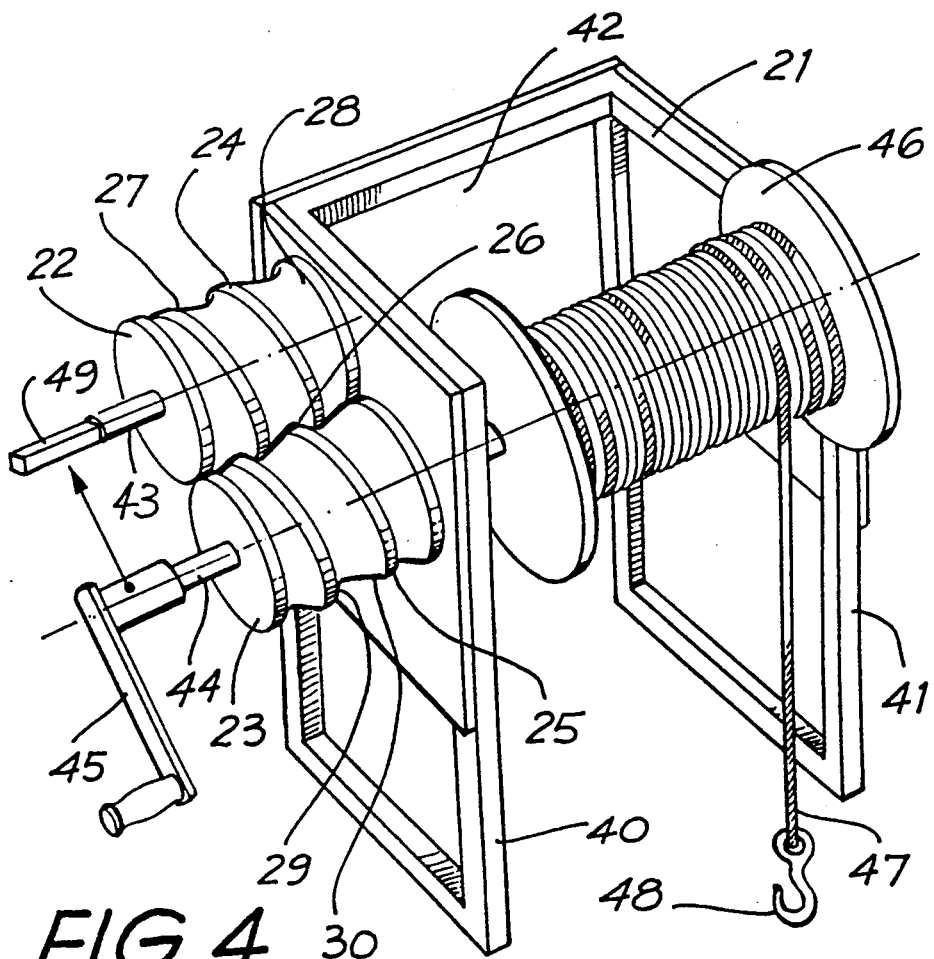

In the embodiment shown in FIG. 4, parts corresponding to those used in earlier figures are similarly referenced but the references are in the twenty series. Thus mmebers 1, 2 and 3 of the earlier figures are referenced in FIGS. 4 as 21, 22 and 23, and so forth.

In FIG. 4, the winch is mounted in a channel-shaped frame or casing 21 having parallel end-walls 40 and 41 connected by an intermediate wall 42. The casing supports two parallel shafts 43, 44 which are journalled into the end wall 40, so as to be able to rotate. The shaft 43 carries a member 22 provided with a longitudinally extending helical tooth 24. The member 22 is keyed to the shaft 43 which has a protruding terminal portion 49 of square cross-section. Portion 49 accepts a handle 45 which, in FIG. 4 is shown fitted to a similar square cross-section terminal portion of the shaft 44.

The shaft 44 has keyed to it a toothed rotary member 23 rigidly attached to a bobbin 46 located between end walls 40, 41 and on which is wound a cable 47 having a hook 48 at its lower end to enable a load to be lifted by the winch, The teeth 24 and 25 of the members 22 and 23 respectively, correspond in shape and function to the teeth shown in FIGS. 1 and 2, and engage one another in a meshing zone 26. Each of the teeth has a gently sloping flank surface and a steeply sloping flank surface. In the case of the tooth 24, these surfaces are respectively referenced 27 and 28. In the case of the tooth 25, these surfaces are respectively referenced 30 and 29.

OPERATION OF WINCH EMBODIMENT

The winch operates as follows.

The load on the cable 47 exerts a torque on the member 23 casing it to try and rotate in a direction which brings its gently-sloping tooth flank surface 30 into engagement with the corresponding tooth flank surface 27 of the member 22. The shaft 43 is not rotated as the profile of the two flank surfaces in contact with one another is such that drive cannot be transmitted between them by way of the meshing zone 26. The load is therefore supported by the winch and cannot desced under its own weight.

If it is required to raise the load, the handle 45 is applied to the shaft 44 and it is turned in a counter-clockwise direction in FIG. 4. This causes the gently-sloping surface 30 of the member 23 to disengage from the corresponding gently sloping flank surface 27 of the member 22, and the steeply-sloping flank surface 29 of the tooth 25 of the member 23 to engage the correspondign steeply sloping flank surface 28 of the member 22. This exerts a bias on it urging it to rotate. As the member 22 is able to rotate, it does so and allows the handle 45 to turn in the load-lifting direction.

If the handle is released during lifting, or the load suddenly becomes greater, the gently-sloping flank surfaces of the members 22, 23 gain come into contact with one another and prevent descent of the load. The two gently sloping flank surfaces of the teeth also engage one another to prevent the handle 45 being turned to lower the load when the handle is in the position shown.

To allow the load to descened in a controlled manner, the handle is removed from the terminal portion of the shaft 44 and applied instead to the corresponding terminal portion 49 of the shaft 43. The handle is then turned in a load-lowering direction. Until the handle 45 is turned, the load on the cable causes the two gently-sloping flank surfaces of the members 23, 23 to jam against one another as has already been described. However, if the handle 45 is turned in the load-lowering direction, it allows the two gently-sloping flank surfaces of the members 22, 23 to release slightly so that the member 23 follows rotation of the member 22 as produced by the handle, and both members then rotate in unison to allow controlled descent of the load. The speed of descent of the load is proportional to the rotation of the handle 45 and if the handle is released, the load remains suspended. Thus, totally-controlled lowering of the load is possible, and the load is incapable of descending freely under its own weight.

Preferably, the flank surfaces of the teeth of the member 22, 23 are profiled so that line contact is achieved between them as has already been described with reference to FIG. 3.

DESCRIPTION OF DIFFERENTIAL EMBODIMENT OF THE INVENTION

Figure 5:
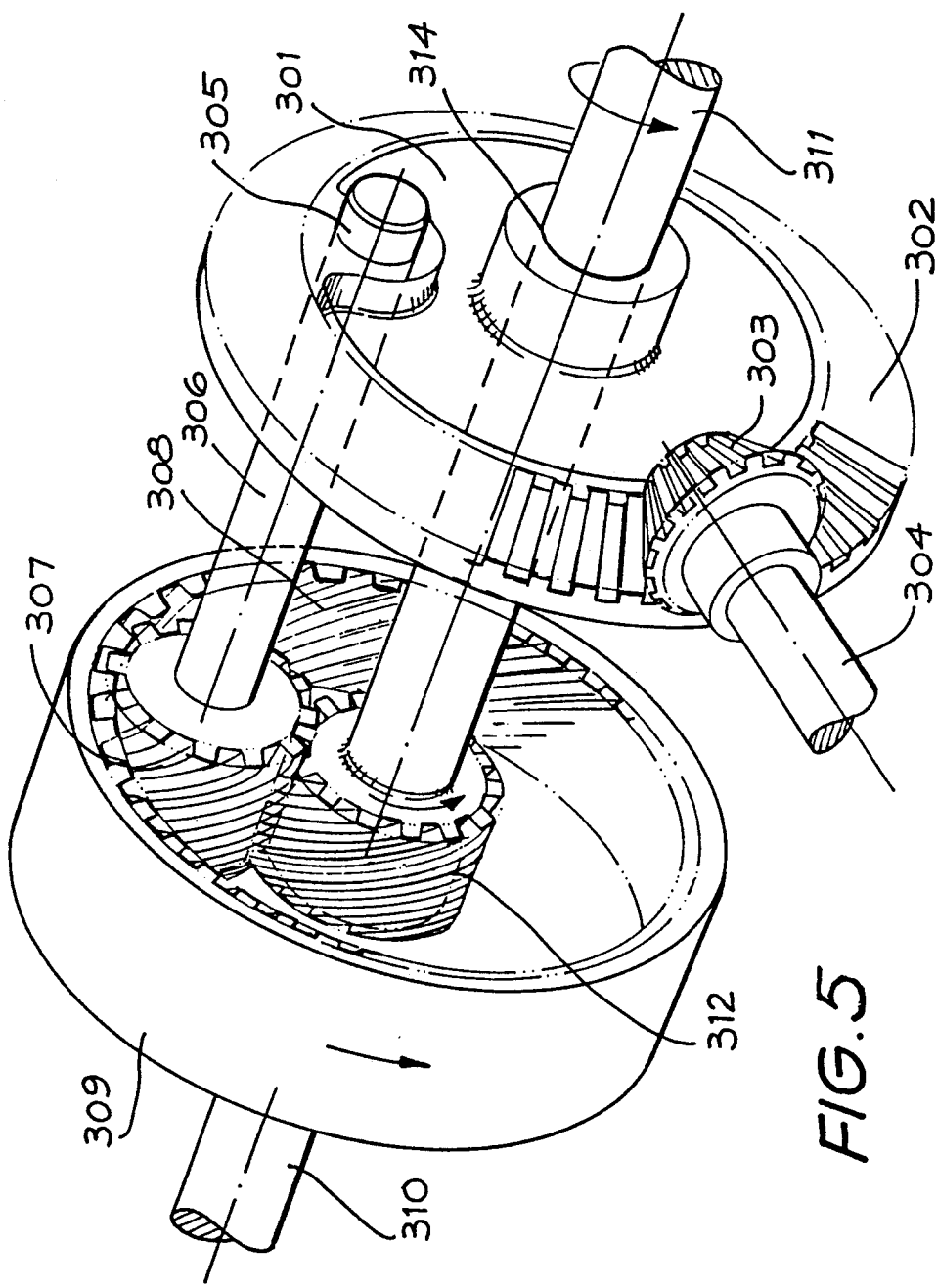

FIG. 5 shows a differential using an internal gear. It has a drive disc 301 provided with a toothed rim 302 engaged by a pinion 303 driven by a drive shaft 304. The disc 301 carries an offset bearing 305 in which is mounted a shaft 306 carrying an externally toothed member 307 in mesh with an internally toothed member 308 provided on a circular casing 309 from which extends a coaxial shaft 310. Shaft 310 extends to one wheel of a vehicle which is to be controlled by the differential, and a second coaxial shaft 311 extends to the opposite wheel of the vehicle. The shaft 311 extends through a journal 314 in the drive disc 301 and it carries at its end a cylindrical gear 312 which meshes with the gear member 307. The gear members 307, 312 can only turn in the same direction of rotation and are termed "plus-plus" geares to distinguish them from the conventional externally toothed gears which can only turn in opposite directions and are known as "plus-minus" gears. Because of the shaping and positioning of their teeth, they are capable of transmitting drive between them only in an inefficient manner. However if they are rotated at the same speed and in the same direction, they will translate over one another and remain, of course, in mesh. The teeth of the internally-toothed member 308 engage those of the externally toothed member 307 and only translate over one another, while remaining in mesh, if the members 307, 308 are turned in oppoite directions respectively.

Under normal operating conditions of the differential, with the vehicle travelling along a straight road, the two shafts 310, 311 rotate at the same speed and in the same direction. The shaft 310 rotates the circuit casing 309 in the direction shown by the arrow. This allows rotation of the member 307 in the oppoiste direction, however, the other shaft 311 turns in the same direction as the shaft 310 and produces a corresponding rotation of the member 312. As the two members prevent the member 307 turning simultaneously in opposite directions, no relative rotation occurs and the drive of the input shaft 304 is transmitted equally to both road wheels.

If the vehicle turns a corner, the shaft 310 increases its rate of rotation while the shaft 311 reduces its rate of rotation by the same increment. The effect of these incremental changes in rotational speed in opposite directions, is to free the member 307 so that it will translate over the teeth of both of the members 309, 312 and allow the wheel on the inside of the corner to decelerate while the wheel on the outside of the corner accelerates. As the teeth of the members 307, 309, 312 mesh inefficiently, a relatively high proportin of the torque of the input drive shaft 304 continues to be applied to the wheel retaining ground adhesion. The extent to which the torque bias is split between the two wheels is determined by the shape and positioning of the teeth of the members 307, 309 and 312. For a further explanation of this reference is hereby made to the co-pending patent application Ser. No. 07/590,239 field Sept. 28, 1990, hereby incorporated by reference.

The use of the differentials described is not limited to vehicles. There are many applications where a differential is required to provide a drive between two elements whose speeds can fluctuate with respect to one another.

We claim:

1. A mechanism including first and second rotary members having straight, parallel axes of rotation and each formed with an external helical tooth extending lengthwise of the axis of the member and having flank surfaces, the teeth of the two members respectively being of the same pitch and of the same hand and overlapping one another in a meshing zone extending lengthwise between the first and second members, whereby the flank surfaces of the first member confront respective flank surfaces of the second member, and the profile and the pitch of the teeth being so chosen that when torque is applied to the first member in one sense, rotation of the first member in said one sense produces sliding movement of one flank surface of the first member over the confronting flank surface of the second member and imparts to the second member a rotational torque which turns the second member in the same sense as the first member and when torque is applied to the first member in the opposite sense, drive cannot be transmitted to the second member and the two members are prevented from rotating.

2. A mechanism as claimed in claim 1, in which the teeth engage one another with line contact rather than point contact.

3. A mechanism as claimed in claim 1, further comprising a handle that is engagable selectively with either of the two members to bring about rotation thereof.

4. A mechanism including first and second rotary members having straight, parallel axes of rotation and each formed with a helical tooth extending lengthwise of the axis of the member and having two flank surfaces, the teeth of the two members respectively being of the same pitch and of the same hand and overlapping one another in a meshing zone extending lengthwise between the two members, whereby the flank surfaces of the first member confront respective flank surfaces of the second member, oine of the first and second rotary members being externally toothed and the other of the first and second rotary members being internally toothed, and the profile and the pitch of the teeth being so chosen that when torque is applied to the first member in one sense, rotation the first member in said one sense produces sliding movement of one flank surface of the first member over the confronting flank surface of the second member and imparts to the second member a rotational torque which turns the second member in the opposite sense to the first member.

5. A mechanism as claimed in claim 4, in which the teeth engage one another with line contact rather than point contact.

6. A mechanism as claimed in claim 4, further comprising a handle that is engagable selectively with either of the two members to bring about rotation thereof.

7. A mechanism as claimed in claim 4, in which the teeth are symmetrical and are profiled so that when torque is applied to the first member in said opposite sense, rotation of the first member produces sliding movement of a flank surface of the first member over the confronting flank surface of the second member and imparts to the second member a rotational torque which turns the second member in said one sense.

8. A mechanism as claimed in claim 4, wherein the teeth of the first and second members each have a steeper flank surface and a less steep flank surface and the steeper flank surfaces of the first and second rotary members confront each other in the meshing zone and the less steep flank surfaces of the first and second rotary members confront each other in the meshing zone, the profiles of the teeth being such that when torque is applied to the first member in said opposite sense, drive cannot be transmitted to the second member and the two members are prevented from rotating.

* * * * *